US 12,155,788 B2

(12) United States Patent
Shah (10) Patent No.: US 12,155,788 B2
(45) Date of Patent: Nov. 26, 2024

(54) SPLIT BILLING FOR A USER ACROSS DIFFERENT TRAFFIC TYPES

(71) Applicant: T-Mobile USA, Inc., Bellevue, WA (US)

(72) Inventor: Mehul Shah, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 244 days.

(21) Appl. No.: 17/707,870

(22) Filed: Mar. 29, 2022

(65) Prior Publication Data

US 2022/0279074 A1  Sep. 1, 2022

Related U.S. Application Data (63) Continuation of application No. 16/985,083, filed on Aug. 4, 2020, now Pat. No. 11,303,760, which is a
(Continued)

(51) Int. Cl.
*H04W 4/24* (2024.01)
*H04L 12/14* (2006.01)
(Continued)

(52) U.S. Cl.
CPC ........ *H04M 15/07* (2013.01); *H04L 12/1471* (2013.01); *H04W 4/24* (2013.01); *H04W 8/20* (2013.01); *H04M 2215/64* (2013.01)

(58) Field of Classification Search
CPC .. H04M 15/07; H04M 2215/64; H04M 15/09; H04M 15/41; H04M 15/44;
(Continued)

(56) References Cited

U.S. PATENT DOCUMENTS 6,463,275 B1  10/2002  Deakin
8,392,324 B2 * 3/2013  Wu ........................ H04W 76/45
705/39
(Continued)

FOREIGN PATENT DOCUMENTS

JP  2002354007 A  12/2002

OTHER PUBLICATIONS

International Searching Authority, International Search Report and Written Opinion, PCT Patent Application PCT/US2019/045800, mailed Dec. 11, 2019, 14 pages.
(Continued)

*Primary Examiner* — Julio R Perez
(74) *Attorney, Agent, or Firm* — Perkins Coie LLP (57) ABSTRACT

The disclosed system provides a facility for split billing for a single user on multiple billing systems. The disclosed system activates the user on each respective billing system using a unique pairing, such as an international mobile subscriber identity that identifies the user, and a mobile station international subscriber directory number that identifies a particular user device. As device data is routed through a telecommunication network via each access point name (APN), the network generates call detail records (CDRs), which include an indication of the APN used. The CDRs are routed to a mediation platform that uses the received APN information to route each CDR to the appropriate target billing system and to the appropriate service types.

20 Claims, 6 Drawing Sheets

Related U.S. Application Data continuation-in-part of application No. 16/726,628, filed on Dec. 24, 2019, now Pat. No. 10,848,623, which is a continuation of application No. 16/058,956, filed on Aug. 8, 2018, now Pat. No. 10,560,581.

(51) Int. Cl.
*H04M 15/00* (2006.01)
*H04W 8/20* (2009.01)

(58) Field of Classification Search
CPC ...... H04M 15/58; H04M 15/61; H04M 15/70; H04M 15/745; H04L 12/1471; H04W 4/24; H04W 8/20
See application file for complete search history.

(56) References Cited

U.S. PATENT DOCUMENTS

| | | | |
|---|---|---|---|
| 8,848,579 | B1 | 9/2014 | Reeves et al. |
| 9,602,677 | B2* | 3/2017 | Sharma ............... H04L 12/1407 |
| 9,686,415 | B2 | 6/2017 | Haslestad et al. |
| 10,560,581 | B1 | 2/2020 | Shah |
| 10,750,335 | B1* | 8/2020 | Palaniappan ........... H04W 4/24 |
| 11,303,760 | B2* | 4/2022 | Shah ....................... H04W 8/20 |
| 11,496,628 | B2* | 11/2022 | Bhoria .................. H04M 15/64 |
| 2001/0024950 | A1 | 9/2001 | Hakala et al. |
| 2002/0119766 | A1 | 8/2002 | Bianconi et al. |
| 2004/0210522 | A1* | 10/2004 | Bissantz ............... H04M 15/41 705/40 |
| 2007/0042750 | A1 | 2/2007 | O'Neil et al. |
| 2008/0119160 | A1 | 5/2008 | Andriantsiferana et al. |
| 2010/0048165 | A1 | 2/2010 | Caldwell et al. |
| 2012/0088469 | A1* | 4/2012 | Cai ....................... H04M 15/57 455/406 |
| 2013/0238472 | A1 | 9/2013 | Fan et al. |
| 2014/0024340 | A1 | 1/2014 | Raleigh |
| 2014/0358750 | A1 | 12/2014 | Hively et al. |
| 2015/0011184 | A1* | 1/2015 | Sutaria ................... H04L 12/14 455/408 |
| 2015/0193750 | A1 | 7/2015 | Ivanoff et al. |
| 2015/0201417 | A1 | 7/2015 | Raleigh et al. |
| 2016/0066186 | A1* | 3/2016 | Kim ..................... H04M 15/66 455/406 |
| 2016/0094973 | A1 | 3/2016 | Girard et al. |
| 2018/0007211 | A1* | 1/2018 | Pieda .................... H04M 15/07 |
| 2020/0213450 | A1 | 7/2020 | Shah |
| 2022/0279074 | A1* | 9/2022 | Shah ....................... H04W 4/24 |

OTHER PUBLICATIONS

Extended European Search Report for EP19846065.1 mailed Mar. 16, 2022; 11 pages.
Office Action from European Appl. Ser. No. 19846065.1 dated Aug. 16, 2023 (6 pages).
Office Action from European Appl. Ser. No. 19846065.1 dated Mar. 17, 2023 (9 pages).

* cited by examiner

| | Subscriber | Route | Target Billing System | Target Device ID |
|---|---|---|---|---|
| 325a | IMSI-1 | APN-1 | Billing System 1 | MSISDN-1 |
| 325b | IMSI-1 | APN-2 | Billing System 2 | MSISDN-2 |
| 325c | IMSI-2 | APN-1 | Billing System 1 | MSISDN-3 |
| 325d | IMSI-2 | APN-2 | Billing System 2 | MSISDN-4 |

FIG. 3A

| | Subscriber | Route | Target Billing System | Target Device ID |
|---|---|---|---|---|
| 355a | IMSI-3 | APN-1 | Billing System 1 | MSISDN-5 |
| 355b | IMSI-3 | APN-1 | Billing System 1 | MSISDN-7 |
| 355c | IMSI-4 | APN-2 | Billing System 2 | MSISDN-6 |
| 355d | IMSI-4 | APN-2 | Billing System 2 | MSISDN-8 |

SPLIT BILLING FOR A USER ACROSS DIFFERENT TRAFFIC TYPES

CROSS-REFERENCES TO RELATED APPLICATIONS

This application is a continuation of U.S. patent application Ser. No. 16/985,083, filed on Aug. 4, 2020, entitled "SPLIT BILLING FOR A USER ACROSS DIFFERENT TRAFFIC TYPES," which is a continuation-in-part of U.S. patent application Ser. No. 16/726,628, filed on Dec. 24, 2019 and entitled "SPLIT BILLING FOR A USER ACROSS MULTIPLE BILLING SYSTEMS," which is a continuation of U.S. patent application Ser. No. 16/058,956, filed on Aug. 8, 2018, and entitled "SPLIT BILLING FOR A USER ACROSS MULTIPLE BILLING SYSTEMS," the disclosures of which are incorporated by reference in their entireties.

BACKGROUND

In a typical telecommunications billing system, a user is activated on a single billing system where taxation, invoicing, and retail billing functions are performed and maintained. However, as embedded subscriber identity module (eSIM) and Internet of Things (IoT) technologies become more widespread, scenarios arise in which a single billing system is unable to adequately meet the needs of telecommunications service providers and end users. For example, a scenario in which a single user purchases a car having telematics capabilities (e.g., navigation or real-time monitoring of driver behavior) and infotainment capabilities (e.g., streaming multimedia such as movies or music to an electronic device installed inside of the car) could raise such concerns. This is particularly true if the telematics usage is charged under a first rate plan (e.g., a flat monthly fee) that is billed directly to a first party such as a car dealership or a car manufacturer, while the infotainment usage is charged under a second rate plan (e.g., a per-gigabyte fee) that is billed directly to a second party such as the user herself. Under traditional billing systems, a single bill would be generated and sent to only one party (e.g., the car dealership or the user), causing the party receiving the bill to manually coordinate payment with one or more other financially responsible parties. These and other problems exist with traditional billing systems. Therefore, a need exists to provide split billing for a user across multiple billing systems such that two or more individual parties may be billed separately for telecommunications services associated with a single user having multiple electronic devices. Furthermore, an individual party may contract with other service providers to provide different types of services. A need also exists to provide split billing based on types of traffic or services provided to the user.

DETAILED DESCRIPTION

A system for split billing for a single user on multiple billing systems is disclosed. For example, the disclosed system would enable a user's connected car to be associated with two billing systems: a first billing system that bills a car dealership (or other entity) for data used by a telematics device in the car; and a second billing system that bills the user herself for data used by an infotainment device in the car. Users are activated on a billing system which rates usage based on a rate-plan (e.g. 100 MB data for $4.99) with a unique pair being associated with each activated user. As described herein, the disclosed system extends the concept of user activation on a single billing system to activation across multiple billing systems such that differentiated or split billing can be achieved. The disclosed system activates the user on each respective billing system using a unique pairing, such as an international mobile subscriber identity (IMSI) and mobile station international subscriber directory number (MSISDN) pair. For example, the user may be activated using an IMSI-1/MSISDN-1 pair for a telematics billing system and an IMSI-1/MSISDN-2 pair for an infotainment billing system.

Figure 1:
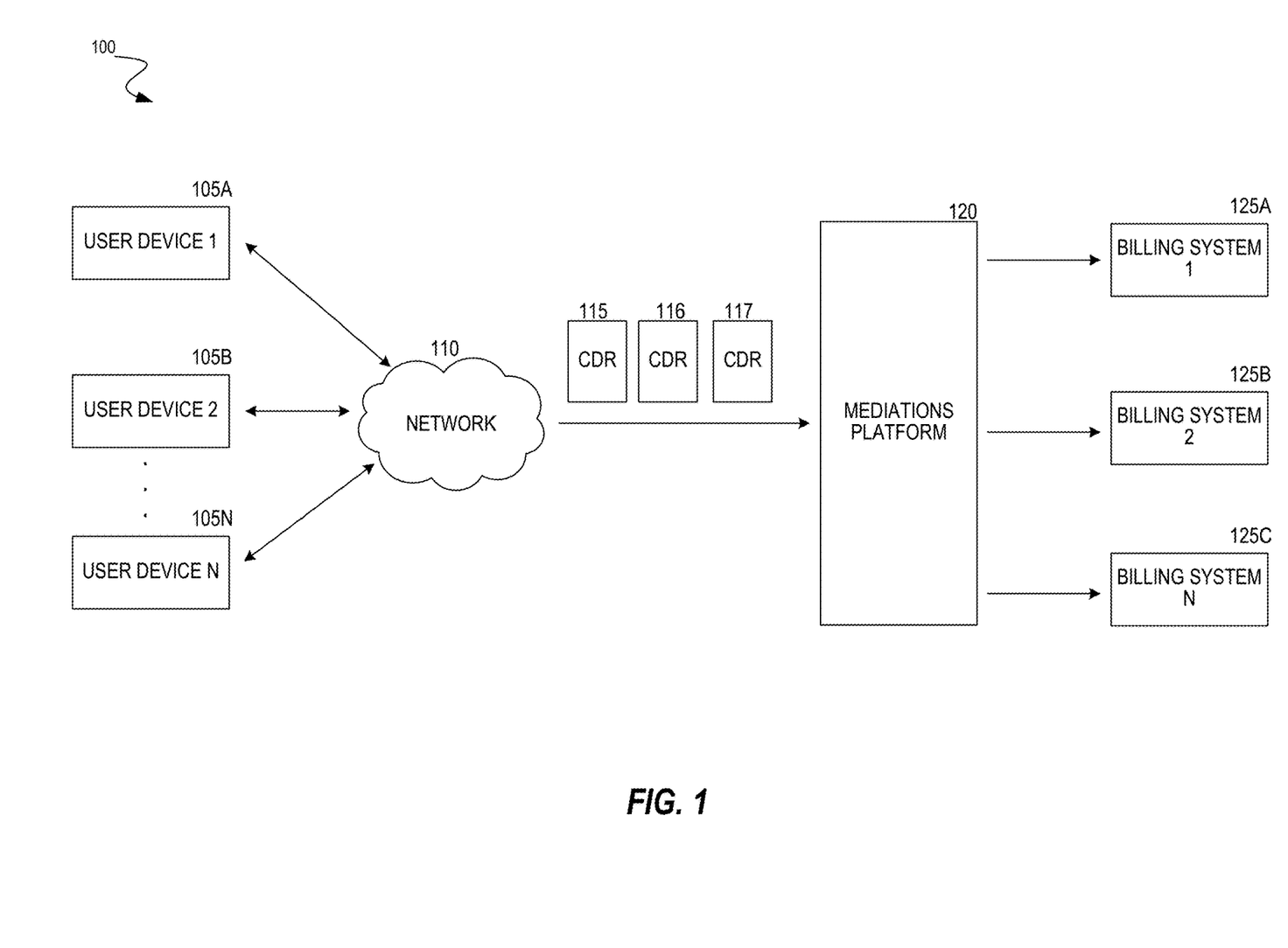
FIG. 1 is a diagram of a representative environment in which a system to provide split billing for a user across multiple billing systems may operate.

Each respective user device is configured to route data through a telecommunications network using a predetermined access point name (APN). An APN may correspond to a gateway connecting two networks (e.g., a 5G network and the public Internet) that was used to transmit or receive information from a respective user device 105a-105n (FIG. 1). For example, a telematics device may route data via APN-1 and an infotainment device may route data via APN-2. As user device data is routed via each APN, the network generates call detail records (CDRs) that each include an indication of the APN used. The CDRs are routed to a mediation platform that uses the received APN information to route each CDR to the appropriate billing system. For example, CDRs identifying APN-1 may be routed to a telematics billing system, which then generates a bill that is sent to a car dealership. Similarly, CDRs identifying APN-2 may be routed to an infotainment billing system, which then generates a bill that is sent directly to the user. Overall, the disclosed system allows different types of usage from the same device to be billed on two different billing systems for two potentially different entities.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a diagram of a representative environment 100 in which a system to provide split billing for a user across multiple billing systems may operate. Although not required, aspects and implementations of the system will be described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

In the environment 100, user devices 105a-105n are associated with a single user, which may be a person or an entity who is a subscriber to services provided by a telecommunications service provider. Each of user devices 105a-105n may be any electronic device capable of sending or receiving data via network 110, as discussed in more detail below with respect to FIG. 2. Network 110 may be any network, including a telecommunications network, capable of facilitating the transfer of data between user devices 105a-105n, network 110, and one or more external application servers, websites, and/or computer systems (not shown). In one embodiment, network 110 may be an Internet Protocol Multimedia Subsystem (IMS) network. IMS is an architectural framework for delivering Internet Protocol ("IP") multimedia to mobile users, such as users of mobile devices like smart phones or tablet computers. An IMS core network ("IMS core") permits wireless and wireline devices to access multimedia, messaging, and voice applications and services. IMS standards and specifications have been promulgated by the 3rd Generation Partnership Project ("3GPP"™). To allow the IMS core to be integrated with Internet resources, the 3GPP specifications use Internet Engineering Task Force protocols within the IMS core, such as Session Initiation Protocol ("SIP") and Diameter. SIP is a signaling protocol used for creating, modifying and terminating two-party or multiparty sessions consisting of one or several media streams.

Figure 2:
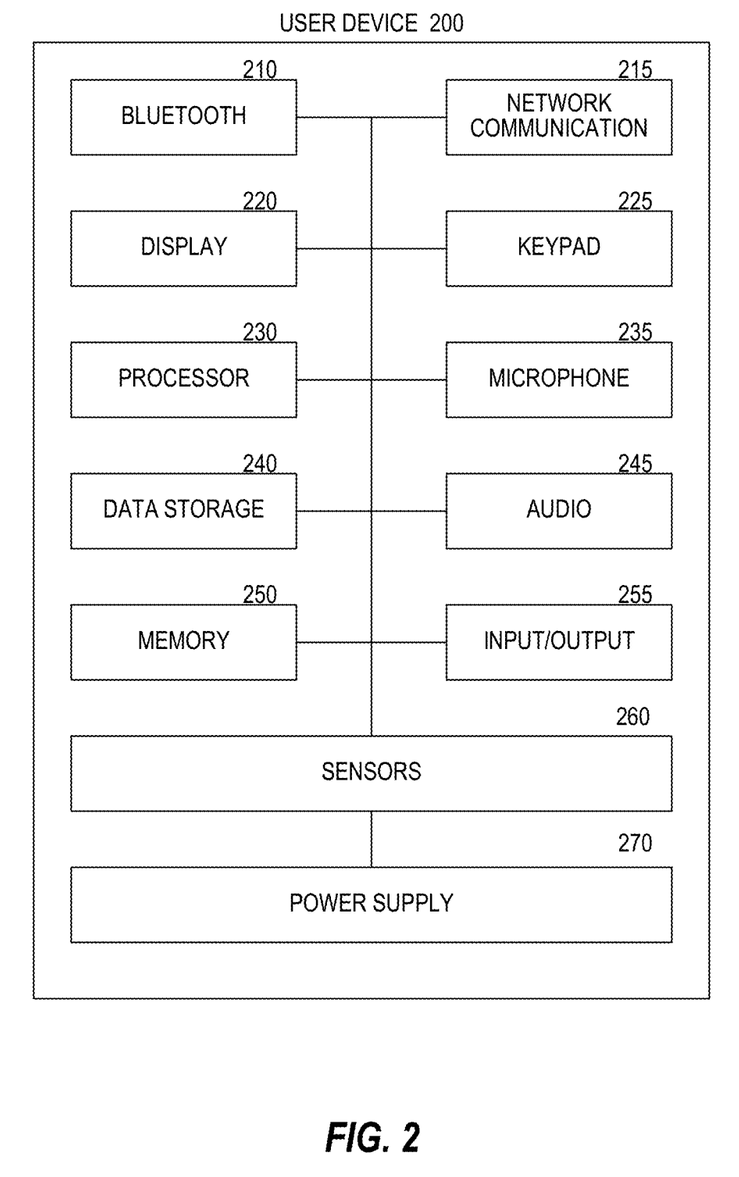
FIG. 2 is a representative block diagram of a user device in accordance with embodiments herein.

FIG. 2 is a representative block diagram 200 of a user device 105a-105n in accordance with embodiments herein. Each user device 105a-105n may include a processor 230 for executing processing instructions, a data storage medium component 240 (e.g., hard drive, flash memory, memory card, etc.), volatile memory and/or nonvolatile memory 250, a power supply 270, one or more network interfaces (e.g., Bluetooth Interface 210; and Network Communication Interface 215, which enables the user device to communicate by transmitting and receiving wireless signals using licensed, semi-licensed or unlicensed spectrum over a telecommunications network), an audio interface 245, a display 220, a keypad or keyboard 225, a microphone 235, one or more sensors 260 (e.g., accelerometers, speedometers, engine diagnostic sensors, etc.) that are used to facilitate particular functions of the electronic device, and other input and/or output interfaces 255. The various components of the user devices may be interconnected via one or more buses. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more Session Initiation Protocol (SIP) or Diameter protocol clients capable of generating, transmitting and interpreting syntactically correct SIP or Diameter protocol messages. SIP clients permit the mobile device to register with and communicate via networks such as IMS networks.

Each user device 105a-105n may be virtually any device for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, infotainment systems, vehicle-mounted devices, Internet of Things (IoT) devices, and integrated devices combining one or more of the preceding devices, and/or the like.

Each user device 105a-105n may connect to a telecommunications network via a trusted radio access network (RAN) or an untrusted RAN. A single user device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

Returning to FIG. 1, as user devices 105a-105n transmit and receive data via network 110, call detail records (CDRs) 115-117 are generated to enable the telecommunications system to track usage of each user device for billing purposes. A CDR is a data record that is produced by a component in a telecommunications network to capture details of transmissions to or from a user device on the network. A CDR may contain multiple attributes associated with the transmissions, such as time, duration, completion status, source number, destination number, sequence number, transmission type (e.g., telephone call, SMS message, MMS message, etc.), error or fault conditions, an associated user or subscriber identification, and/or routing information. In the disclosed system, example CDRs 115-117 are received by mediation platform 120 and processed as described herein.

The particular routing information contained in CDRs 115-117 may comprise Access Point Name (APN) information. As explained in more detail herein, the disclosed system may use APN information to help determine the particular billing system 125a-125c to which each received CDR should be routed. The source number information contained in each received CDR may comprise a mobile station international subscriber directory number (MSISDN) that is sufficient to uniquely identify a particular user device (e.g., user device 105a or user device 105b, etc.) associated with a data transmission. In addition, the associated user or subscriber information contained in each received CDR 115-117 may comprise an international mobile subscriber identity (IMSI) that is sufficient to uniquely identify a user who is associated with one or more respective user devices 105a-105n.

Mediation platform 120 receives each CDR 115-117 and determines which particular billing system 125a-125c is associated with each received CDR. On each billing system, the user is activated using a unique identification pairing so that each respective billing system can separately track and bill usage across multiple user devices 105a-105n that belong to the user. The unique identification pairing on each billing system may correspond to an IMSI/MSISDN pair that identifies the user and the user's respective device. The IMSI for a particular user may stay consistent across all of the multiple billing systems. By contrast, the MSISDN may be unique for each separate user device 105a-105n. For example, User A may own an automobile that contains two user devices: a telematics device 105a and an infotainment device 105b. A first billing system 125a may be responsible for generating bills for telematics usage. Therefore, User A has a primary activation on the first billing system 125a using an IMSI-1/MSISDN-1 pair, where IMSI-1 uniquely identifies User A while MSISDN-1 uniquely identifies telematics device 105a. In some embodiments, particularly embodiments in which the user device includes a SIM with a single profile, network usage will occur only with the IMSI-1/MSISDN-1 pair. Continuing the example, a second billing system 125b may be responsible for generating bills for infotainment usage (e.g. streaming music/audio/video service usage). Therefore, User A has a secondary activation on the second billing system 125b using an IMSI-1/MSISDN-2 pair, where IMSI-1 uniquely identifies User A while MSISDN-2 uniquely identifies infotainment device 105b. Subsequently, when each respective billing system receives a CDR from mediation platform 120, the billing system may read IMSI/MSISDN information from the CDR in order to track device usage, generate a bill, and send it to the appropriate user or party. In some embodiments, the MSISDN information used for a primary activation on a billing system may be transmitted to the corresponding user device, while in other embodiments the MSISDN information used for the primary activation may not be transmitted to the corresponding user device. In some embodiments, the MSISDN information for a secondary activation on a billing system may not be transmitted to the corresponding user device.

Mediation platform 120 is responsible for receiving a CDR, determining the specific billing system that should process the received CDR for billing purposes (i.e., the target billing system), modifying the received CDR if necessary in order to conform with a prior activation on the target billing system, and transmitting the CDR to the target billing system for processing. Mediation platform 120 uses a series of rules to determine how a received CDR should be processed and transmitted to a target billing system. To process received CDRs, mediation platform 120 may maintain one or more mediation tables that contain information necessary to route each received CDR to the appropriate respective billing system.

Various alternative embodiments are possible with the disclosed system, including embodiments wherein a first party is billed for usage associated with a first telematics device and a first infotainment device (per sample entries 325a and 325b, as explained below with reference to FIGS. 3A-B), and embodiments wherein a second party is billed for usage associated with a second telematics device and a second infotainment device (per sample entries 325c and 325d, as explained below with reference to FIGS. 3A-B). Still other various alternative embodiments are possible with the disclosed system.

Figure 3A:
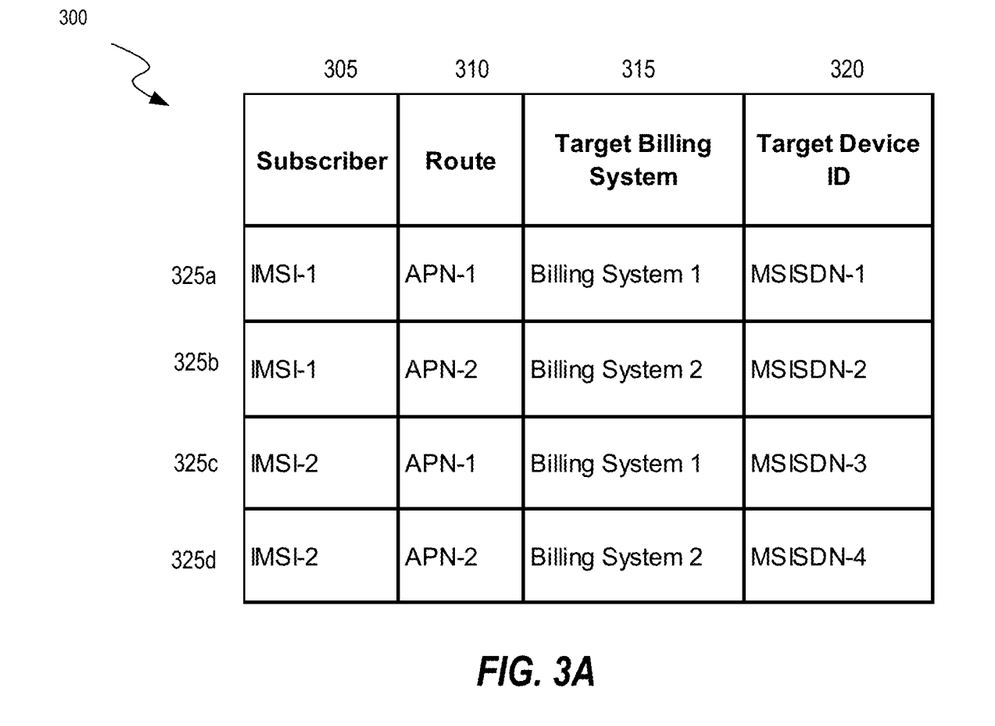
FIG. 3A depicts an example mediation table that facilitates split billing in accordance with embodiments herein.
Figure 3B:
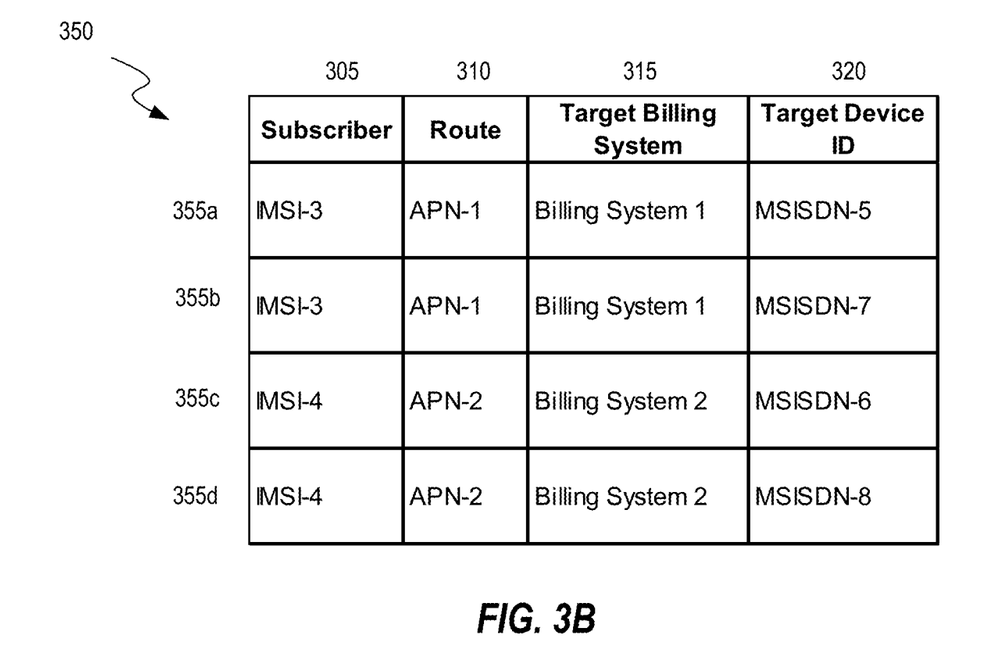
FIG. 3B depicts another example mediation table that facilitates split billing in accordance with embodiments herein.

FIGS. 3A-B depict example mediation tables 300 and 350 that facilitate split billing in accordance with embodiments herein. Each sample entry 325a-325d in mediation tables 300 and 350 corresponds to a rule for determining how mediation platform 120 routes each received CDR to the appropriate target billing system. Mediation table 300 or 350 includes "Subscriber" column 305, "Route" column 310, "Target Billing System" column 315, and "Target Device ID" column 320. For each sample entry 325a-325d in mediation table 300 or 350, Subscriber column 305 contains an identifier that uniquely identifies a single user or telecommunications subscriber (e.g., User A). In an embodiment, the identifier contained in Subscriber column 305 comprises an IMSI of the associated user or telecommunications subscriber. In an embodiment, mediation platform 120 reads the IMSI from a received CDR and stores the IMSI in Subscriber column 305.

For each sample entry 325a-325d in mediation tables 300 and 350, Route column 310 contains an identifier that uniquely identifies a route through which data passes in a telecommunications network. In an embodiment, mediation platform 120 reads the route data from a received CDR and stores the route data in route column 310. The route data stored in column 310 may comprise an identification of an APN that was used to route user device data through the telecommunications network. Each entry in Target Billing System column 315 contains an identifier that uniquely identifies a billing system to which a received CDR should be routed based on information contained in mediation tables 300 and 350, as described in more detail below. Target Device ID column 320 contains an identifier that is unique to the user device that is associated with the received CDR. The identifier stored in Target Device ID column 320 is also the identifier initially used to activate the user device on the associated target billing system. Therefore, mediation platform 120 may alter the Target Device ID in the CDR before transmission to a target billing system to ensure that the Target Device ID is consistent with a previous activation on the target billing system.

Each mediation table 300 or 350 includes sample entries 325a-325d which correspond to four sample rules that may be enforced by mediation platform 120 to determine the target billing system for a received CDR. According to sample entry 325*a*, when mediation platform 120 receives a CDR having a subscriber value of IMSI-1 (indicating, e.g., User A) and a Route value of APN-1 (indicating, e.g., telematics usage), then mediation platform 120 will transmit the received CDR to Billing System 1 (i.e., the desired or proper target billing system), where the CDR includes a subscriber value of IMSI-1 and a target device ID of MSISDN-1. As explained herein, Billing System 1 uses the IMSI-1/MSISDN-1 pair in the CDR received from mediation platform 120 to facilitate generating a bill for User A (corresponding to IMSI-1) for data usage of the user device corresponding to MSISDN-1 (e.g., a first telematics device).

According to sample entry 325*b*, when mediation platform 120 receives a CDR having a subscriber value of IMSI-1 (again indicating User A) and a Route value of APN-2 (indicating, e.g., infotainment usage), then mediation platform 120 will transmit the received CDR to Billing System 2 with a subscriber value of IMSI-1 and a Target Device ID of MSISDN-2. Mediation platform 120 transmits the CDR with the Target Device ID indicated in Target Device ID column 320, regardless of any device identification information present in the CDR as initially received. Billing System 2 uses the IMSI-1/MSISDN-2 pair in the CDR received from mediation platform 120 to facilitate generating a bill for User A (corresponding to IMSI-1) for data usage of the user device corresponding to MSISDN-2 (e.g., a first infotainment device).

According to sample entry 325*c*, when mediation platform 120 receives a CDR having a subscriber value of IMSI-2 (indicating, e.g., User B) and a Route value of APN-1, then mediation platform 120 will transmit the received CDR to Billing System 1 with a subscriber value of IMSI-2 and a target device ID of MSISDN-3. As explained herein, Billing System 1 uses the IMSI-2/MSISDN-3 pair in the CDR received from mediation platform 120 to facilitate generating a bill for User B (corresponding to IMSI-2) for data usage of the user device corresponding to MSISDN-3 (e.g., a second telematics device).

According to sample entry 325*d*, when mediation platform 120 receives a CDR having a subscriber value of IMSI-2 (again indicating User B) and a Route value of APN-2, then mediation platform 120 will transmit the received CDR to Billing System 2 (i.e., the target billing system) with a subscriber value of IMSI-2 and a Target Device ID of MSISDN-4. Mediation platform 120 transmits the CDR with the Target Device ID indicated in Target Device ID column 320, regardless of any device identification information present in the CDR as initially received. Billing System 2 uses the IMSI-2/MSISDN-4 pair in the CDR received from mediation platform 120 to facilitate generating a bill for User B (corresponding to IMSI-2) for data usage of the user device corresponding to MSISDN-4 (e.g., a second infotainment device).

Figure 4:
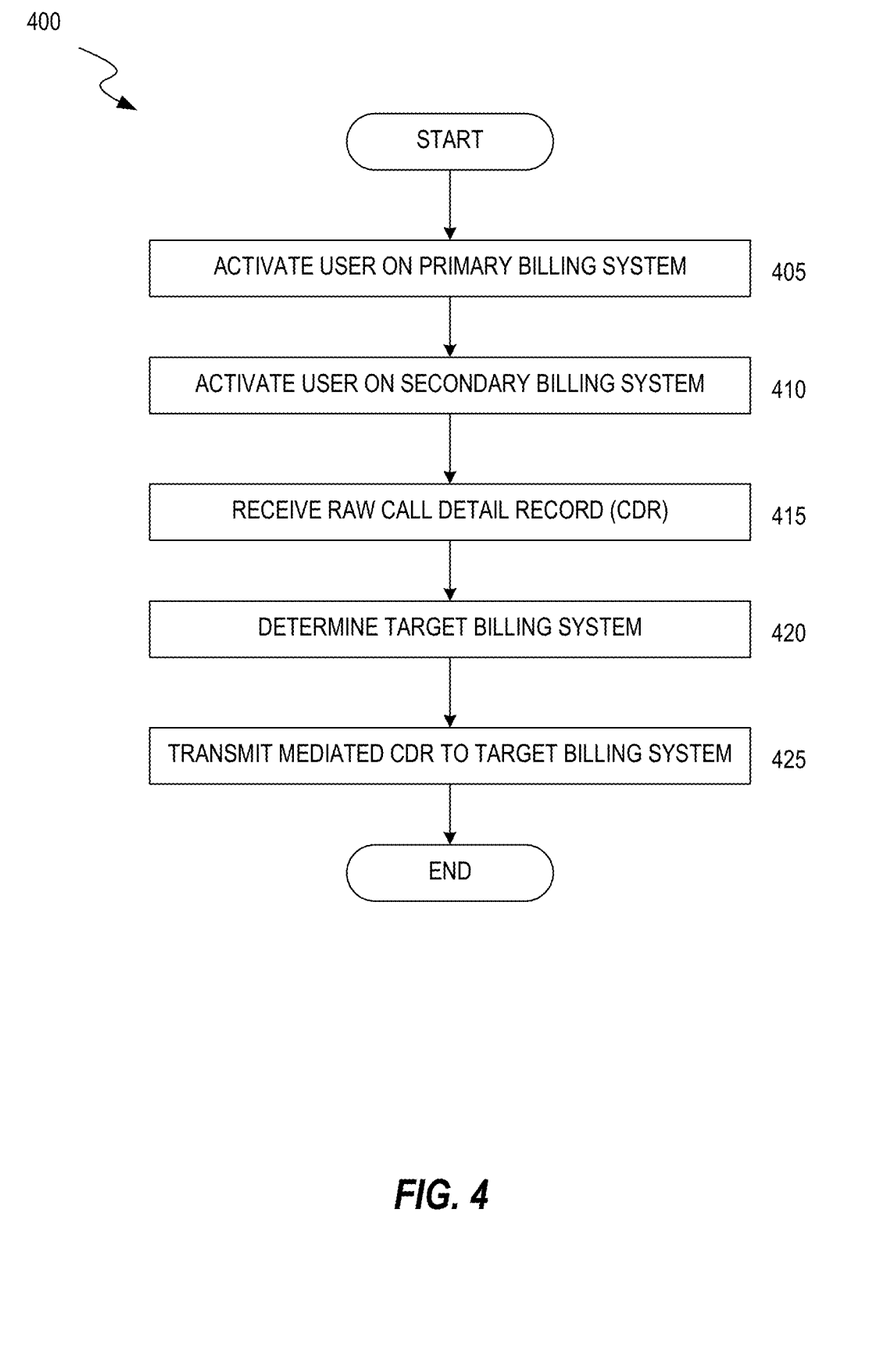
FIG. 4 is a flowchart showing a procedure for facilitating split billing for a user across multiple billing systems in accordance with embodiments herein.

FIG. 4 is a flowchart 400 showing a procedure for facilitating split billing for a user across multiple billing systems in accordance with embodiments herein. At block 405, a user is activated on a first billing system using a unique user identification (e.g., IMSI-1) and a unique user device identification for a first user device (e.g., MSISDN-1). At block 410, the same user is activated on a second billing system using the same unique user identification (e.g., IMSI-1) and a unique user device identification for a second user device (e.g., MSISDN-2). Although flowchart 400 only shows billing system activations at blocks 405 and 410, the disclosed system may complete any number of additional activations on additional, separate billing systems, and at different times. Each respective billing system on which the user is activated may bill for data usage under a different rate plan, and may generate and send bills or invoices to different parties for payment.

At block 415, mediation platform 120 receives a CDR associated with data usage from a user device and proceeds to block 420 to determine a target billing system associated with the received CDR. As explained herein, mediation platform 120 determines the target billing system for a received CDR based on information contained in the CDR and one or more rules maintained by mediation platform 120 in a mediation table 300 or 350. At block 425, the disclosed system transmits the received CDR to the target billing system in accordance with the rules maintained by mediation platform 120. As explained herein, the CDR that is transmitted to the target billing system contains at least a subscriber identifier (e.g., an IMSI) and a device identifier (e.g., a MSISDN) corresponding to a previous activation on the target billing system.

The disclosed system repeats blocks 415 through 425 for each CDR that is received as user devices consume data on a telecommunications network. At periodic intervals (such as at the end of a monthly billing cycle), each respective billing system generates a bill for the user based on the CDRs received by the respective billing system. Each respective billing system then sends the generated bills to the responsible financial party, which may be the user herself or a different party that is responsible for payment.

As wireless technology advances, various types of in-vehicle services are now available to users. An example scenario of offering different types of services to a user in a connected vehicle is described below:

1. In-vehicle telematics connectivity (e.g., navigation system). Data usage associated with this type of service is typically paid for by the vehicle manufacturer or dealership to the network operator pursuant to business contracts. For example, the data usage can be assigned a Route value of APN-1 (also referred to as Business-to-Business B2B APN) and directed to Billing System 1 as described above in connection with FIGS. 3A-3B.

2. In-Vehicle infotainment services. Data usage associated with this type of service is typically paid by the end-user (e.g., the owner of the vehicle) pursuant to end-user agreements. For example, the data usage can be assigned a Route value of APN-2 (also referred to Business-to-Customer B2C APN) and directed to Billing System 2 as described in connection with FIGS. 3A-3B.

3. In-vehicle third-party services. In addition to the types of service provided directly by the manufacturer/dealership and the network operator, third-party content providers can contract with them so that more services can be made available to users. For example, multimedia content providers can have agreements in place with the manufacturer/dealership to run streaming services over the B2B data connection in the vehicles. Content providers can also establish business relationships with the network operator to provide such services. The content providers can specify certain data usage (e.g., streamed music) to be billed separately to the providers in the B2B and/or B2C data connections.

To fulfill the needs of providing a variety of services to users and to enable correct billing for all the parties involved, a finer granularity is needed in split billing so that data usage can be classified and billed differently based on the service types. In achieving this, communication node(s) in the core network can identify traffic types of the data usage so that call records (e.g., CDRs) for billing purposes can be updated or created accordingly.

Figure 5:
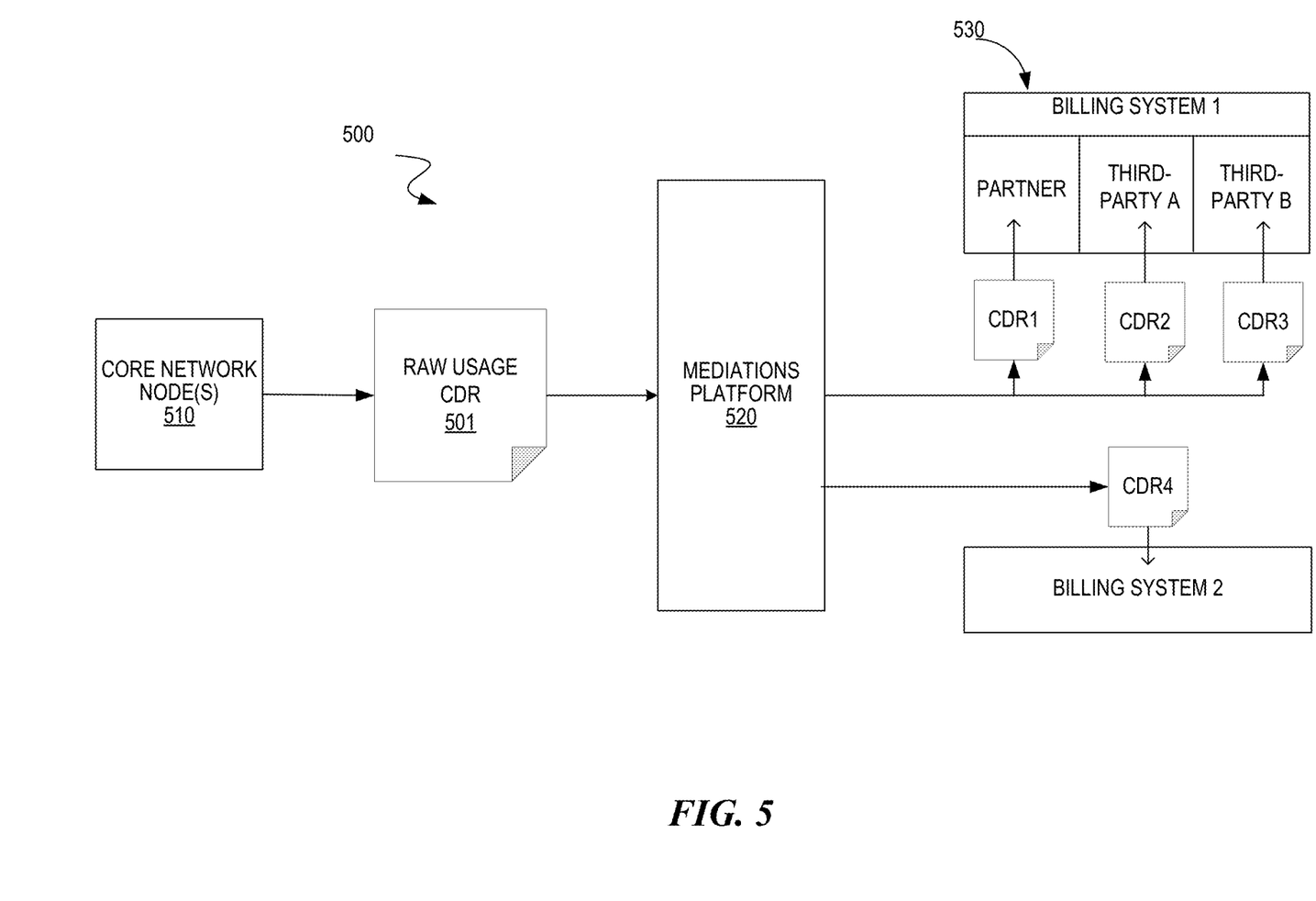
FIG. 5 illustrates an example overview of a system that provides split billing for a user across multiple billing systems according to different traffic types in accordance with one or more embodiments of the present technology.

FIG. 5 illustrates an example overview of a system 500 that provides split billing for a user across multiple billing systems according to different traffic types in accordance with one or more embodiments of the present technology. The manufacturer/dealership or the third-party service providers can inform the network operator of the types of services that need to be categorized for split billing. The core network nodes 510, such as Gateway General Packet Radio Service Support Nodes (GGSN) or Packet Data Network Gateway (PGW), are then configured by the network operator so that different types of services are associated with different Service Name Indications (SNIs) according to a set of rules. Table 1 shows example SNR rules that can be used to identify different types of services.

TABLE 1

Example SNI Rules

| Example Data Service | SNI Rules |
| --- | --- |
| Ad Services | *.server1.serviceprovider1.com |
| Account Management | *.server2.serviceprovider1.com |
| Streaming Audio | *.server3.serviceprovider1.com |

Based on the SNI rules, traffic can be identified and tagged in the corresponding CDRs. In some embodiments, the identification of the service types can be implemented in the form of Service Identifiers (SIDs) in the CDRs. For example, information in the raw usage CDR 501 can be tagged with different SIDs according to the SNI rules.

To enable accurate split billing to the manufacturer/dealership and the third-party service providers, the mediation platform 520 can maintain a separate set of rules that maps the traffic information (e.g., the provider identifier, APNs, and/or SIDs) to the destination billing system(s)/location(s). Table 2 shows an example rule table that can be implemented by the mediation platform 520. The mediation platform 520 can associate a range of International Mobile Subscriber Identities (IMSIs) with a manufacturer/dealership or a partner. Each manufacturer or partner can be associated with multiple APNs and multiple billing systems (e.g., as shown in FIGS. 3A-3B). Within the same billing system, data traffic can be associated with different SID values.

TABLE 2

Example Rule Table for the Mediation Platform

| IMSI Range | Manufacturer/Partner | APN | Destination Billing System | SID values |
| --- | --- | --- | --- | --- |
| 310 260 85 0000000 to 310 260 85 9999999 | Manufacturer A | B2B → B2b.oem.tmus.com | Billing System #1 | SID1 SID2 |
| 310 260 85 0000000 to 310 260 85 9999999 | Manufacturer A | B2C → B2c.vwgoa.com | Billing System #2 | None |

In the raw usage CDR 501 as shown in FIG. 5, data usage associated with specific third-party provider(s) is mixed with data usage that is associated directly with the manufacturer/dealership. To provide better privacy protection to the parties, it is desirable to have separate CDRs that are visible to corresponding parties only. In some embodiments, the CDRs can be deposited in separate locations in the billing system with separate access control policies. For example, a location is only accessible to a corresponding third-party service provider and remains inaccessible to other parties. Table 3 shows an example algorithm that can be implemented by the mediation platform 520 to update and/or create CDRs for data usages associated with respective service types.

TABLE 3

Example algorithm for creating/updating CDRs

Get Raw Usage CDR from Core Network
Open Raw Usage CDR
Read IMSI from Raw Usage CDR
Read Aggregate Usage from Raw Usage CDR
If (IMSI within IMSI Range1)
Then
    Identify Partner A according to the rule table;
    Identify usage for SIDs 1 and 2;
    Compute Billing Usage for Partner A = Aggregate usage − usage for SID 1 − Usage for SID2;
    Create new CDR or update existing CDR with usage for Partner A only;
    Create new CDR with usage only for SID1;
    Create new CDR with usage only for SID2;
    Deposit newly created CDRs in appropriate folders on the corresponding Billing System for Partner A;
Else After the CDRs are placed in appropriate locations in the billing system, the billing system can perform rating of the usage based on configured rates (e.g. $0.50/MB for manufacturer(s)/partner(s), $0.60 for third-parties, etc.). The rated usage is then invoiced or billed to the corresponding party. In some embodiments, the network operator can impose higher rates on unidentified data usage (e.g., data that does not have an associated SID) to incentivize the partner(s)/manufacturer(s) to provide information regarding the service types (e.g., SNI rules) so that fair rates can be charged.

Referring back to FIG. 5, Billing System 1 (530) has three separate locations for depositing CDRs: one location for a partner of the network operator, one location for third-party A, and one location for third-party B. Upon examining the raw usage CDR 501, the mediation platform 520 separates data usage associated with third-party A and creates CDR2. The mediation platform 520 also separates data usage associated with third-party B and creates CDR3. A new CDR1 can be created for the partner. Alternatively, the raw usage CDR 501 can be updated as CDR1 to include data usage for partner only. Billing System 1 then generates different bills for the partner, third-party A, and third-party B respectively. The CDRs and the bills are visible and accessible to the respective parties only.

Figure 6:
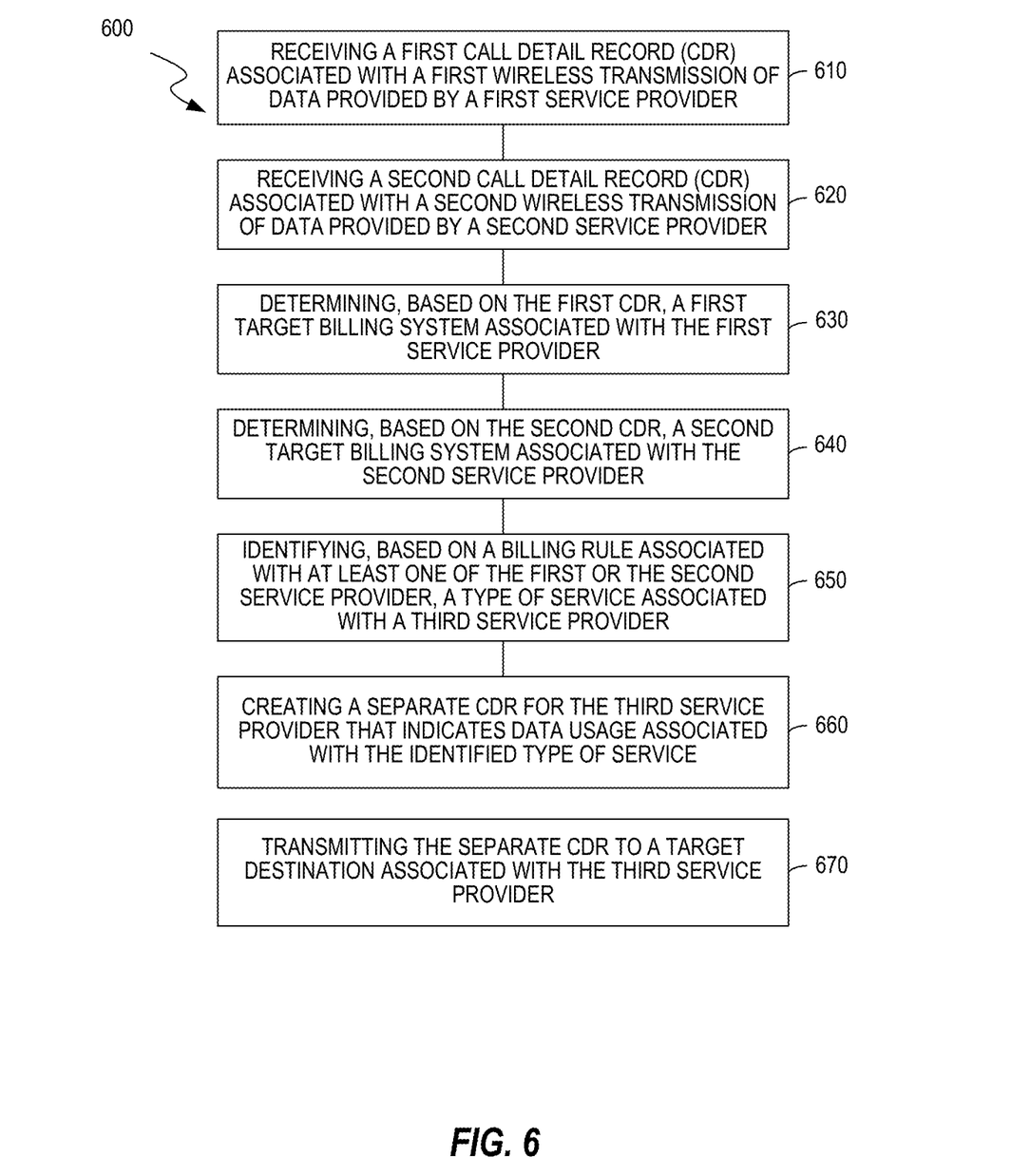
FIG. 6 is a flowchart representation of a method for xxx in accordance with one or more embodiments of the present technology.

FIG. 6 is a flowchart representation of a method 600 for billing in wireless communication in accordance with one or more embodiments of the present technology. The method 600 includes, at operation 610, receiving a first call detail record (CDR) associated with a first wireless transmission of data provided by a first service provider (e.g., telematics service provided by the vehicle manufacturer or dealership). The method 600 includes, at operation 620, receiving a second call detail record (CDR) associated with a second wireless transmission of data provided by a second service provider (e.g., infotainment service provided by the network operator). The first and the second CDRs are associated with a same user. Also, the first and second wireless transmissions of data are performed over the same cellular communications network.

The method 600 includes, at operation 630, determining, based on the first CDR, a first target billing system associated with the first service provider. The method 600 includes, at operation 640, determining, based on the second CDR, a second target billing system associated with the second service provider. The method 600 includes, at operation 650, identifying, based on a billing rule associated with at least one of the first or the second service provider, a type of service associated with a third service provider (e.g., streaming service provided a third-party content provider). The method 600 includes, at operation 660, creating a separate CDR for the third service provider that indicates data usage associated with the identified type of service. The method 600 includes, at operation 670, transmitting the separate CDR to a target destination associated with the third service provider.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. A non-transitory computer-readable medium carrying instructions that, when executed by a computing system, cause the computing system to perform operations to route call detail records (CDRs) to target billing systems to facilitate split billing, the operations comprising:

receiving a first call detail record (CDR) that includes a subscriber identifier, a device identifier, and route information, wherein the route information specifies a route via which data is transmitted to or from a device associated with the device identifier over a network;

accessing a stored set of rules for routing of billing information associated with services provided via the network, wherein each rule in the stored set of rules specifies a target billing system to receive usage data associated with data usage over the network;

identifying an applicable rule in the stored set of rules to be applied to the first CDR based on the subscriber identifier and the route information; and sending a second CDR to the target billing system associated with the applicable rule to facilitate billing, wherein the second CDR contains at least some information included in the first CDR, and wherein the second CDR includes a target device identifier specified in the applicable rule regardless of the device identifier included in the first CDR.

2. The non-transitory computer-readable medium of claim 1, wherein the operations further comprise: generating the second CDR based on the applicable rule and contents of the first CDR.

3. The non-transitory computer-readable medium of claim 1, wherein the second CDR comprises an altered version of the first CDR.

4. The non-transitory computer-readable medium of claim 1, wherein the subscriber identifier comprises an international mobile subscriber identity (IMSI), the device identifier comprises a mobile station international subscriber directory number (MSISDN), and the route information comprises an access point name (APN).

5. The non-transitory computer-readable medium of claim 1, wherein the second CDR is sent to a separate location within the target billing system subject to an access control policy limiting access to the separate location.

6. The non-transitory computer-readable medium of claim 5, wherein the separate location is accessible only to a service provider associated with the separate location, and wherein the second CDR contains usage data associated only with the service provider.

7. The non-transitory computer-readable medium of claim 6, wherein the operations further comprise: updating the first CDR to remove the usage data associated with the service provider; and sending the updated first CDR to a different target billing system.

8. A computing system, comprising:
at least one hardware processor; and
at least one non-transitory memory carrying instructions that, when executed by the computing system, cause the computing system to perform operations to route call detail records (CDRs) to target billing systems to facilitate split billing, the operations comprising:
receiving a first call detail record (CDR) that includes a subscriber identifier, a device identifier, and route information,
wherein the route information specifies a route via which data is transmitted to or from a device associated with the device identifier over a network;
accessing a stored set of rules for routing of billing information associated with services provided via the network,
wherein each rule in the stored set of rules specifies a target billing system to receive usage data associated with data usage over the network;
identifying an applicable rule in the stored set of rules to be applied to the first CDR based on the subscriber identifier and the route information; and
sending a second CDR to the target billing system associated with the applicable rule to facilitate billing,
wherein the second CDR contains at least some information included in the first CDR, and
wherein the second CDR includes a target device identifier specified in the applicable rule regardless of the device identifier included in the first CDR.

9. The computing system of claim 8, wherein the operations further comprise:
generating the second CDR based on the applicable rule and contents of the first CDR.

10. The computing system of claim 8, wherein the second CDR comprises an altered version of the first CDR.

11. The computing system of claim 8, wherein the subscriber identifier comprises an international mobile subscriber identity (IMSI), the device identifier comprises a mobile station international subscriber directory number (MSISDN), and the route information comprises an access point name (APN).

12. The computing system of claim 8, wherein the second CDR is sent to a separate location within the target billing system subject to an access control policy limiting access to the separate location.

13. The computing system of claim 12, wherein the separate location is accessible only to a service provider associated with the separate location, and wherein the second CDR contains usage data associated only with the service provider.

14. The computing system of claim 13, wherein the operations further comprise:
updating the first CDR to remove the usage data associated with the service provider; and
sending the updated first CDR to a different target billing system.

15. A computer-implemented method to route call detail records (CDRs) to target billing systems to facilitate split billing, the method comprising:
receiving a first call detail record (CDR) that includes a subscriber identifier, a device identifier, and route information,
wherein the route information specifies a route via which data is transmitted to or from a device associated with the device identifier over a network;
accessing a stored set of rules for routing of billing information associated with services provided via the network,
wherein each rule in the stored set of rules specifies a target billing system to receive usage data associated with data usage over the network;
identifying an applicable rule in the stored set of rules to be applied to the first CDR based on the subscriber identifier and the route information; and
sending a second CDR to the target billing system associated with the applicable rule to facilitate billing,
wherein the second CDR contains at least some information included in the first CDR, and
wherein the second CDR includes a target device identifier specified in the applicable rule regardless of the device identifier included in the first CDR.

16. The computer-implemented method of claim 15, further comprising
generating the second CDR based on the applicable rule and contents of the first CDR.

17. The computer-implemented method of claim 15, wherein the second CDR comprises an altered version of the first CDR.

18. The computer-implemented method of claim 15, wherein the subscriber identifier comprises an international mobile subscriber identity (IMSI), the device identifier comprises a mobile station international subscriber directory number (MSISDN), and the route information comprises an access point name (APN).

19. The computer-implemented method of claim 15, wherein the second CDR is sent to a separate location within the target billing system subject to an access control policy limiting access to the separate location.

20. The computer-implemented method of claim 19, wherein the separate location is accessible only to a service provider associated with the separate location, and wherein the second CDR contains usage data associated only with the service provider.

\* \* \* \* \*